United States Patent [19]

Ziegler et al.

[11] Patent Number: 4,842,319
[45] Date of Patent: Jun. 27, 1989

[54] DEFLECTOR SHIELD AND GUARD ASSEMBLY FOR MOTOR VEHICLES

[75] Inventors: John H. Ziegler, Longmont; Gerald R. Oakley, Berthoud; Daniel F. Krause, Sr., Loveland, all of Colo.

[73] Assignee: Autotron Products, Inc., Longmont, Colo.

[21] Appl. No.: 107,151

[22] Filed: Oct. 13, 1987

[51] Int. Cl.[4] ............................................. B60J 1/20
[52] U.S. Cl. ........................................ 296/91; 296/95.1; 180/68.6
[58] Field of Search ............... 296/91, 950, 136, 217; 180/68.6; 150/52 K

[56] References Cited

U.S. PATENT DOCUMENTS

| | | | |
|---|---|---|---|
| 2,792,254 | 5/1957 | Hagglund | 296/91 |
| 2,868,308 | 1/1959 | Biewald | 180/68.6 |
| 3,022,848 | 2/1962 | Heiser | 296/91 X |
| 3,862,777 | 1/1975 | Schifano | 296/91 |
| 3,987,863 | 10/1976 | Mittendorf et al. | 180/68.6 |
| 4,095,835 | 6/1978 | Ensor | 296/91 X |
| 4,236,592 | 12/1980 | Ziegler | 180/68.6 |
| 4,627,657 | 12/1986 | Daniels et al. | 296/950 X |

Primary Examiner—Robert B. Reeves
Assistant Examiner—Brian Sells
Attorney, Agent, or Firm—Ralph T. Rader

[57] ABSTRACT

A deflector shield for a motor vehicle is characterized by having a molded, wrap-around shield assembly along the horizontal and vertical side edges of the hood portion directly behind the grille which is secured in place by elongated flexible, shock mounting strips at spaced intervals along the horizontal edge and vertical sides of the hood portion, and a molded wrap-around cover plate in overlapping relation to the horizontal edge and opposite vertical side edges of the shield; and molded guard members are disposed in overlying relation to a surrounding portion of the front grille of the vehicle together with front fender guard members which conform to and are disposed in overlying relation to the front fender and headlight portions of the vehicle.

13 Claims, 4 Drawing Sheets

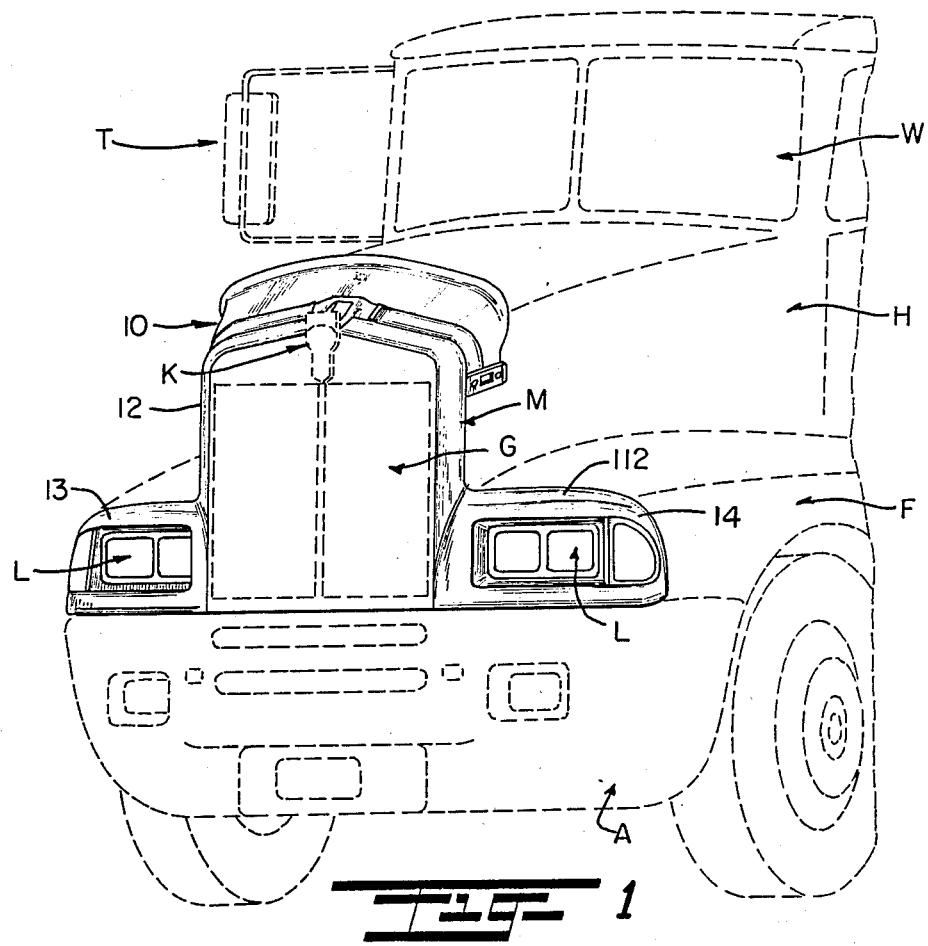
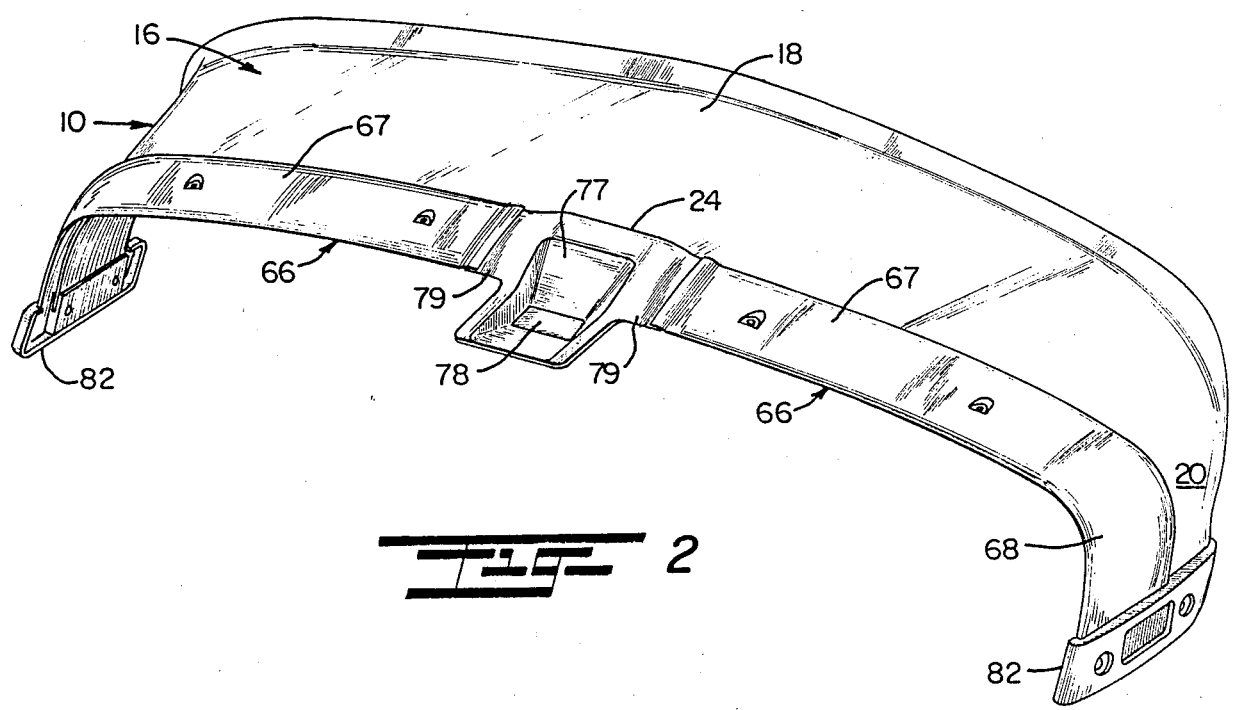

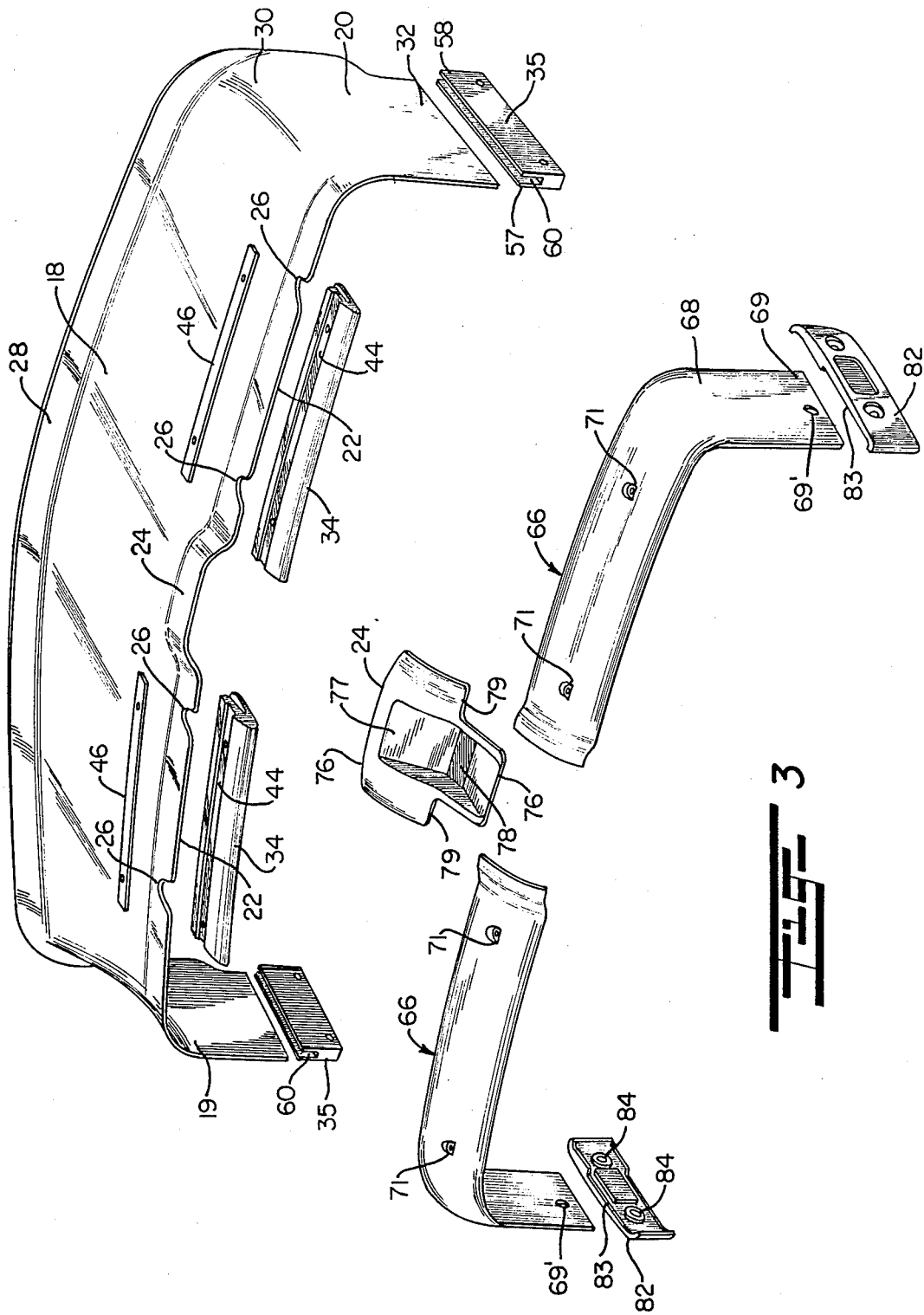

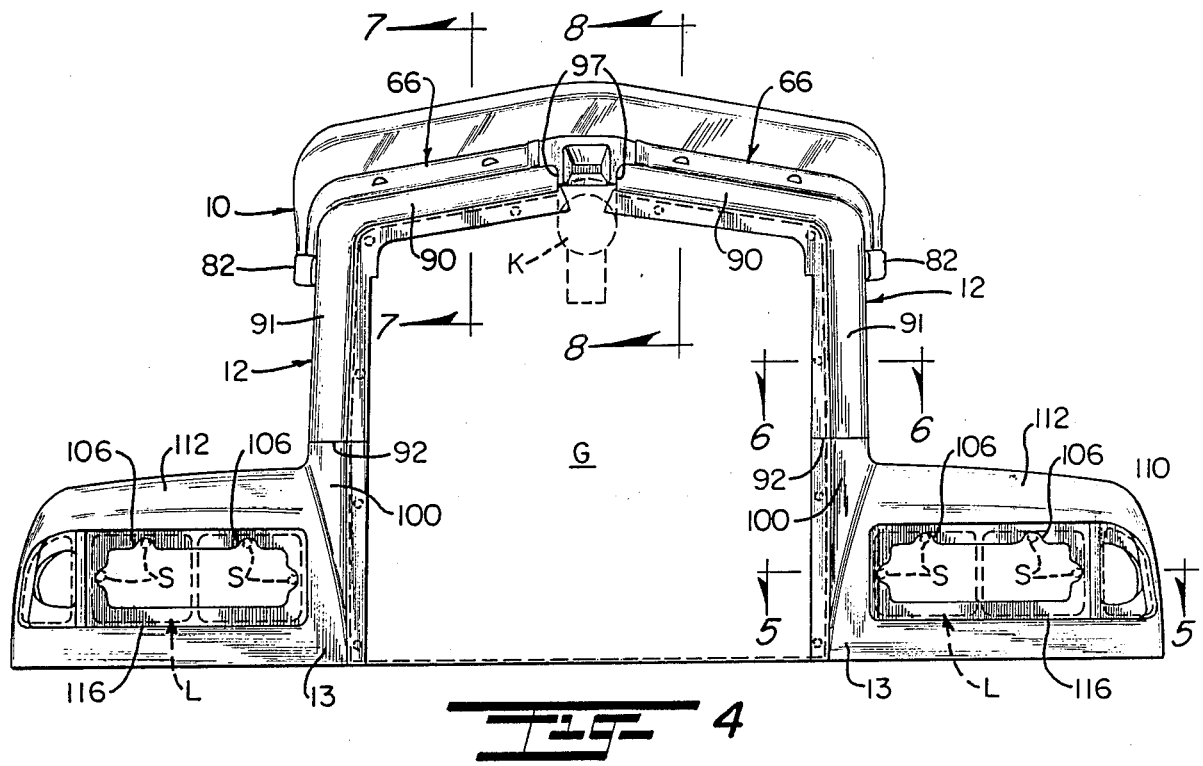
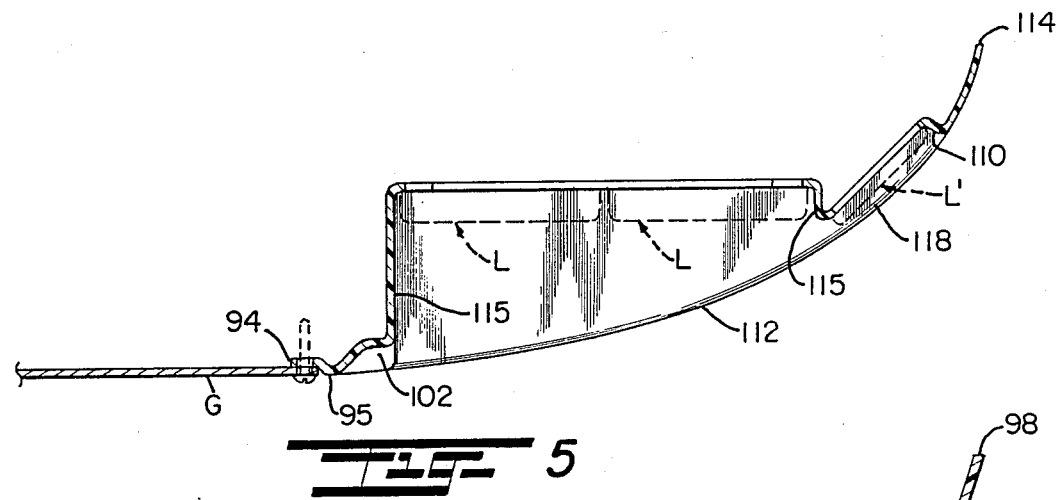
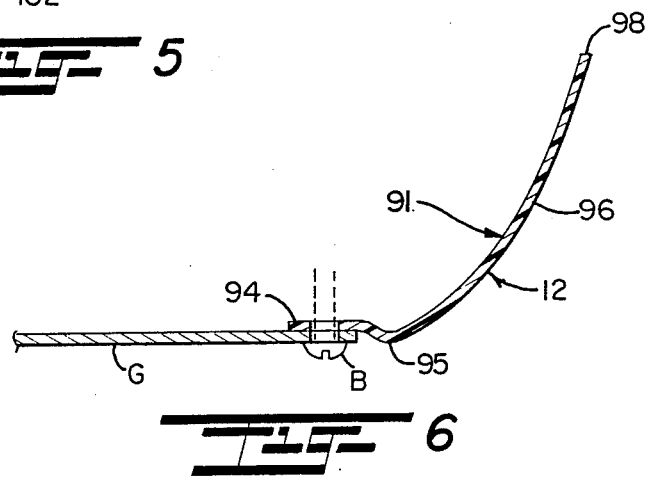

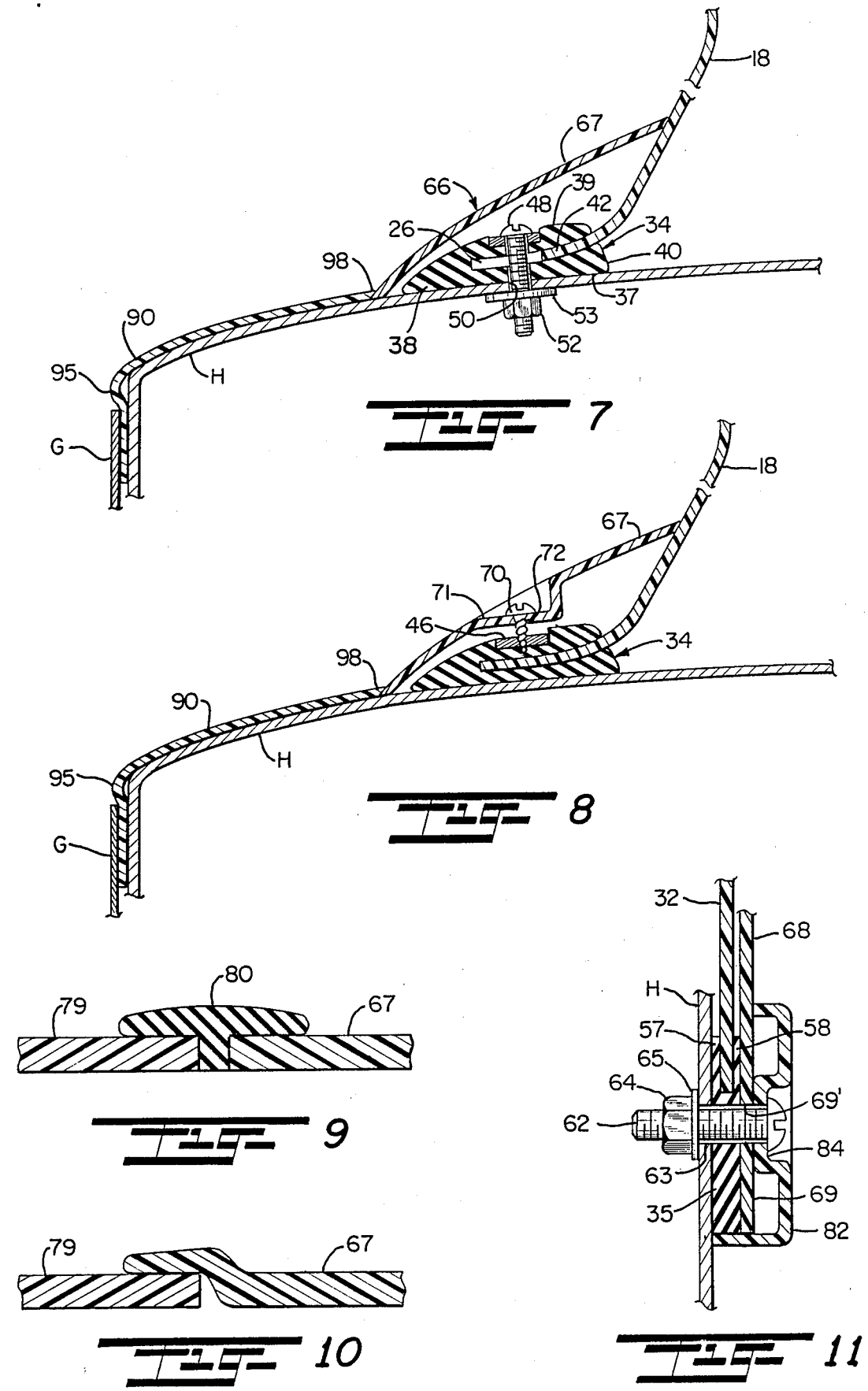

DEFLECTOR SHIELD AND GUARD ASSEMBLY FOR MOTOR VEHICLES

This invention relates to deflector shield assemblies for motor vehicles, and more particularly relates to a novel and improved molded guard and shield unit for the front portions of a motor vehicle wherein said units are usable alone or in combination with one another to protect the area surrounding the grille and the fender portions as well as the windshield of a motor vehicle from the impact of foreign objects.

BACKGROUND AND FIELD OF THE INVENTION

It is customary to mount protective covers and shields on the front of a motor vehicle to protect the vehicle from the impact and accumulation of insects, debris and other foreign objects. Those areas that are most prone to exposure to such foreign objects are the windshield area, hood, grille and front fender sections surrounding the headlights and parking lights of the vehicle. In particular, trucks and buses which are driven primarily over roads and highways at relatively high speeds are more exposed to damage to the frontal areas along with reduced visibility through the windshield area as a result of impact of foreign objects or the accumulation of insects. For instance, the area which surrounds the grille portion and headlight areas of the front fenders of most trucks are typically painted or chrome-plated and susceptible to pitting or severe scarring as a result of the impact of foreign objects as described making them difficult to clean and more susceptible to rapid deterioration under steady driving conditions. The same is true of the painted sections of the hood, particularly along the top and upper side surfaces of the hood.

Although the aforementioned problems associated with highway driving are more pronounced for larger motor vehicles, such as, commercial trucks the front ends of most trucks are so designed as to make it difficult to devise an effective cover which in combination with a deflector shield for the windshield area can be easily mounted either alone or in combination with one another without introducing any substantial drag which would tend to reduce fuel economy. It is known to provide a shield which is of unitary construction and of the so-called molded wraparound type. For example, a molded wrap-around shield unit is disclosed in U.S. Letters Pat. No. 4,627,657 to J. A. Daniels et al and assigned to the assignee of the present invention. However, it is proposed to make the entire shield including the side wings or fairings of unitary construction and to be so mounted as to minimize the danger of cracking of the shield. Cracking usually occurs as a result of direct connection of the shield to the hood without any means for dampening or absorbing shocks or vibration imparted to the shield under high speed driving conditions. Further, it is desirable to so mount the shield assembly with respect to the hood as to permit its use in combination with a front cover or guard assembly in surrounding relation to the grille and which will extend over the critical front fender portions of the vehicle as well.

Deflector shields have been devised which are of one-piece construction and formed of thermoplastic polymers, such as, Plexiglass, Lucite or acrylic materials including the use of generally channel-shaped mounting brackets to clampingly engage a lower edge of the shield in such a way as to avoid insertion of fasteners through the thickness of the shield. Representative of this approach are U.S. Pat. Nos. 4,518,191 to R. D. Williams et al and 4,153,129 to P. J. Redmond. In each, the shield is adhesively secured within the channel and in certain cases an additional bracket or connecting arm is required to secure the channel portion to the hood of the vehicle. Other bracket designs of this type are disclosed in U.S. Pat. No. 4,262,954 to M. H. Thompson and No. 4,621,860 to L. H. Gerst.

In addition to the foregoing, U.S. Pat. No. 2,792,254 to E. A. Hagglund is of interest for disclosing a combination shield and guard for the windshield, hood and grille section of a vehicle. In Hagglund, however, the entire assembly is intended more for mounting as a unitary structure primarily over the grille and front fender portions of the vehicle and does not offer the alternative of usability of the shield and cover portions either alone or in combination with one another. Other representative patents are U.S. Pat. Nos. 4,471,991 to G. H. Matthias; 4,236,592 to J. H. Ziegler; 3,015,517 to A. K. Thornburgh and 3,008,756 to W. S. Lindhardt.

SUMMARY OF THE INVENTION

Accordingly an object of the present invention is to provide for a novel and improved deflector shield for protecting the hood and windshield areas of a motor vehicle.

It is another object of the present invention to provide for a novel and improved shield and cover assembly which conforms to the contour of the top and sides of a motor vehicle hood and grille and can be easily mounted in a minimum number of steps; and further wherein the shield unit proper can be mounted on the hood of the vehicle in such a way as to effectively absorb shocks while avoiding direct insertion of fasteners through the thickness of the shield itself.

It is a further object of the present invention to provide for a novel and improved, low profile, molded wrap-around shield assembly together with a novel and improved means of flexibly mounting the assembly to the hood portion of a motor vehicle; and further to provide for a cover assembly to facilitate attachment of the shield assembly to the vehicle.

An additional object of the present invention is to provide for a novel and improved aerodynamically contoured shield unit conformable for mounting on a vehicle alone or in combination with guard members which define a protective covering around the outside of the grille and the front fender portions of the vehicle.

In accordance with the present invention, a novel and improved deflector shield unit has been devised for a motor vehicle having a hood portion and grille with an outer surrounding area around the grille which extends between the upper horizontal edge and vertical side portions of the hood and grille, the shield unit including an elongated shield having a front, generally horizontal edge and opposite vertical side edges conforming to and overlying the upper horizontal edge and vertical sides of the hood and a transparent shield portion inclining rearwardly away from the horizontal and opposite vertical side edges of the hood portion. Shock mounting means are comprised of at least one elongated flexible strip which is interposed between the shield and hood, the mounting means including a rearwardly and upwardly inclined channel in which the horizontal edge of the shield is inserted, and fastener means for fastening the shock mounting means to the hood including means for retaining the horizontal edge of the shield in the channel of the shock mounting means. A molded, wrap-around cover plate having an upper horizontal portion and opposite vertical side portions is disposed in at least partially overlapping relation to the horizontal edge and opposite vertical side edges of said shield, and side shock mounting means are affixed to opposite vertical sides of the hood portion and are covered by end caps which define continuations of the cover plate at opposite vertical side edges of the hood portion.

The shield unit as described above is so connected to the hood portion of the vehicle that it can be employed independently of or in combination with molded grille and fender guard members, the grille guard member disposed in overlying relation surrounding the grille portion, and the fender guard members conforming to and disposed in surrounding relation to each front fender and headlight portion of the vehicle. The guard members are characterized by being composed of a tough, durable, impact-resistant plastic material, the members being secured in place by the existing fasteners for the grille and headlight portions of the vehicle.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a perspective view illustrating a preferred embodiment of the shield and guard assembly installed on the front of a truck;

FIG. 2 is a perspective view in more detail of the preferred form of shield unit of the present invention;

FIG. 3 is an exploded view of the preferred form of shield unit in accordance with the present invention;

FIG. 4 is a front view in elevation of the preferred form of shield and guard assembly;

FIG. 5 is a cross-sectional view taken about lines 5—5 of FIG. 4;

FIG. 6 is a cross-sectional view taken about lines 6—6 of FIG. 4;

FIG. 7 is a cross-sectional view taken about lines 7—7 of FIG. 4;

FIG. 8 is a cross-sectional view of the attachment of the cover plate to the shield mount of the present invention;

FIGS. 9 and ten are cross-sectional views illustrating alternate forms of attachment of the cover plate and center cap; and FIG. 11 is a cross-sectional view illustrating the mounting of the end cap and the cover plate with respect to the shield at one end of the assembly.

DETAILED DESCRIPTION OF THE PREFERRED EMBODIMENT

Referring in more detail to the drawings, the preferred embodiment of the present invention is illustrated and will be hereinafter described specifically in relation to its mounting on a Kenworth Model T600A manufactured and sold by Kenworth Truck Company of Seattle, Wash. The front end styling of the Kenworth truck, as represented at T, presents particular problems in the utilization of a combined shield and cover assembly by virtue of the generally squared or upstanding configuration of the front hood section H and front fender F and headlight sections L which flank the opposite, left and right hand sides of the grille section G. Another standard part of the Kenworth truck is the central hand grip area as represented at K which is raised slightly with a central recessed area to facilitate unlatching of the grille section G to pivot the grille and entire hood section H forwardly about a lower hinge line located at the base of the grille section G and directly above the bumper area A. Again, while the preferred embodiment of the present invention will be described with respect to the Kenworth truck, its application and conformability for use with other motor vehicles will be readily appreciated.

In accordance with the present invention, a preferred form of cover and shield assembly is broadly comprised of a shield unit 10 which is affixed to the top and upper sides of the hood H behind the grille section G, a grille cover or mask 12 which is interposed between the grille G and shield unit 10 in surrounding relation to the top and sides of the grille, and fender covers or masks 13 and 14 surrounding the headlight sections L. The windshield area of the truck is designated at W.

Referring to FIGS. 1 to 4, and particularly to FIG. 2, it will be noted that the preferred form of shield unit 10 comprises a molded, wrap-around shield 16 of transparent material and of unitary construction having a curved or generally arcuate intermediate section 18 which forms the shield proper. The shield 10 is dimensioned to traverse the entire width of the hood and terminates at opposite ends in downwardly directed sides 19 and 20 which overlie opposite side portions of the hood H. The shield section 18 is inclined rearwardly and upwardly at a relatively low angle on the order of 40° to 45° from a forward clamping edge 22 of limited width and which is provided with a raised center section 24 corresponding to the raised center portion K of the truck. Generally V-shaped recessed areas 26 are located at spaced intervals along the forward edge 22, there being a pair of spaced recesses 26 on opposite sides of the raised center portion 24. The shield proper 18 curves rearwardly and upwardly to terminate at its rearward extremity in an inwardly rolled edge 28. The sides or vertical side wing extensions 19 and 20 at either end of the shield are joined by generally radial or curved sections 30, the side extensions 20 directed downwardly to terminate in flat squared end portions 32.

The shield unit 16 is resiliently mounted to the top and upper side surfaces of the hood H by a pair of upper, spaced horizontally extending shock mounts 34 and side shock mounts 35, each of the shock mounts being defined as an elongated flexible or resilient extrusion or strip. As seen from a consideration of FIGS. 3 and 7, each shock mount 34 is of generally triangular cross-section having a flat base 37, a tapered end portion 38 which diverges rearwardly and is separated into upper and lower walls 39 and 40 by an intermediate curved channel 42 curving rearwardly and upwardly through the greater width of the strip. The channel 42 is sized to accommodate the front clamping edge 22 and the lower curved end of the shield portion 18, each strip 34 being centered with respect to the recessed portions 26 on either side of the raised portion 24 with the lower wall 40 being of sufficient thickness to form a relatively thick cushion or base support for the shield. In addition, the upper wall 39 of each strip 34 has an external groove portion 44 which traverses the length of the strip intermediately between opposite front and rear edges and is sized to receive a flat narrow metal, hold-down plate 46. Spaced openings or bores are formed in the plate 46 which are aligned with correspondingly sized bores extending vertically through the thickness of the upper and lower walls 39 and 40 of the strip 34 for insertion of fastening bolts 48 which project downwardly through the recesses 26 and bores 50 in the hood portion H of the vehicle and are secured by means of suitable nuts and washers designated at 52 and 53, respectively. A suitable adhesive may be applied between contacting surfaces of the clamping edge and upper and lower walls 39 and 40 to assist in securely retaining the lower edge of the shield in position within the shock mount strips 34.

As shown in FIGS. 3 and 11, each of the side shock mounts 35 is formed of an extruded strip of generally U-shaped configuration having upper bifurated ends 57 and 58 with flat exterior surfaces and an intermediate channel 60 therebetween facing or opening upwardly between the opposed inner and outer ends 57 and 58. Each strip is securely bolted or otherwise fastened to the side of the hood H by bolts 62 extending through bores at opposite ends of the strip and which bores are aligned with bores 63 formed in the upper sides of the hood. Suitable nuts and washers 64 and 65 are secured to the inner ends of the bolts to complete the attachment of the strip on either side of the hood.

A molded, wrap-around cover plate assembly for the shield unit 16 consists of left and right cover sections 66, each cover section having an upper horizontal portion 67 curving outwardly and downwardly at a low gradual angle along the upper horizontal section of the hood, then bending or curving more sharply in the downward direction into a vertical side portion 68 which traverses one of the upper side portions of the hood H. Specifically, the upper horizontal portion 67 is disposed in overlapping relation to the lower connecting edge 22 of the shield, and the vertical side portion 68 overlaps the vertical side 20 of the shield unit and terminates in a lower edge 69 assembled with the side shock mount 35 as shown in FIG. 10.

As shown in FIG. 7, each upper horizontal portion 67 of a cover section 66 is positioned over a shock mount 34 and lower end of the shield proper 18 so as to incline upwardly and rearwardly from the hood portion H at its front lower edge to bear against the surface of the shield at its forward edge. The horizontal portion 67 is slightly bowed in cross-section so as to present a smooth generally convex exterior surface but is interrupted by flat or level surface portions 71 at spaced intervals along its length, as shown in FIG. 8, with an opening 72 in the level portion 71 to receive a sheet metal screw 70 which passes through openings in the hold-down plates 46 of the shock mounts 34 so as to retain the cover section 67 in place. As shown, a pair of sheet metal fastener screws 70 may be employed along each of the upper horizontal portions 66 and 67.

A central cover cap 76 is disposed between the cover sections 66, the cap 76 having a central recessed area 77 and a narrow depression 78 within that area to fit into the hand grip K on the hood of the vehicle. Side wings 79 on the cap 76 extend laterally from the recessed area, the wings 79 conforming in contour to the cross-sectional contour of the horizontal cover portions 67 and are joined to the inner edges of the cover portions 67 by generally T-shaped cap joints 80, as shown in FIG. 9, or by overlapping the wings 79 of the cap 76 over the inner edges of cover sections 66 as shown in FIGS. 2 and 10.

The cover plate assembly also includes side cover caps 82, as shown in FIGS. 3 and 10, each being sized to enclose one of the side shock mounts 35. As best seen from FIG. 11, each cap 82 is of generally shallow cup-shaped configuration with an indented portion 83 on one side and counterbored portions 84, one portion 84 passing through the indented portion 83. The bolts 62 are inserted through the cover cap 82, shock mount 35 and hood H as hereinbefore described; and, on one side of the cap 82 which contains the indented portion 83, the bolt 62 also extends through an opening 69' in the lower edge 69 of each vertical side portion 68. Preferably, the cover sections and cover caps as described are composed of a durable and relatively inflexible thermoformed plastic material which will serve as a protective cover for the lower connecting end portion 32 of the shield and of the shock mounts 34 and 35 while providing a smooth exterior surface along the lower edge of the shield. It will be noted further that the shield and cover assembly as described are mounted on the hood H directly behind the grille portion G so as not to interfere with the installation of the grille and fender guard assembly as hereinafter described.

As seen from a consideration of FIGS. 1 and 4, the mounting of the shield and cover assembly 10 as described directly to the hood behind the grille G enables the alternative use in combination with the cover and shield assembly 10 of front grille guard sections 12 and fender guard sections 13. As noted, there is a left and right grille guard section 12, each section including an upper horizontal portion 90 extending along the upper horizontal end of the hood behind the grille and a vertical portion 91 extending along the vertical side of the hood which surrounds the grille and which terminates in a lower squared end surface 92.

As best seen from FIG. 6, the vertical side grille portion 91 includes a relatively flat attaching flange 94 which fits behind the outer edge of the grille G and may be secured by existing fasteners, such as, the bolts B on the grille section. The portion 91 includes a front offset nose portion 95 which curves rearwardly into a somewhat bowed or arcuate molded portion 96 conforming to the contour of the hood portion which surrounds the grille G. The upper horizontal portion 90 of each grille guard 12 conforms in cross-section to the vertical side 91 and terminates in a squared end surface 97 which abuts the front end of the hand grip K at the top center of the grille. Moreover, as noted from FIGS. 7 and 8, a rearward edge 98 of the upper portion 90 of the guard member abuts the lower edge of the cover section 66.

The lower fender guard sections 13 form continuations of the grille guards 12 along the lower end of the grille molding and thereafter extend laterally over the headlight sections L and specifically the molding which surrounds the headlight sections L. As best seen from a consideration of FIGS. 4 and 5, each of the sections 13 includes a vertical side leg 100 which corresponds in cross-section in its mounting to the grille to that of the vertical sides 91 of the grille guards and like parts are correspondingly enumerated. However, the nose end 95 which forms a continuation of the attaching flange 94 inclines rearwardly as at 102 and merges into an outside generally rectangular border 112 which conforms to the configuration of the fender F surrounding the headlight portion. The border 112 curves laterally away from the vertical leg 100 and trails or curves somewhat rearwardly around the parking light L' and outside of the fender to terminate in an outer curved end surface 114. Inset wall portions 115 extend rearwardly away from the border 112 to surround headlight area L. An inner, generally rectangular frame 116 is provided with recesses 106 to facilitate connection in surrounding relation to the headlights by means of existing fasteners, such as, the sheet metal screws as represented at S. The rearwardly curved sector 114 forms a secondary border with a relatively shallow inset wall portion 118. In this fashion, the grille guard members 12 and fender guard members 13 serve to protect the front edge of the hood portion which surrounds the grille G as well as the front fenders and molding which surrounds the headlight and parking light sections as described; or, in other words, those regions most susceptible to damage resulting from impact of foreign materials.

Again, it should be emphasized that the mounting of the grille guard may be accomplished independently of or in addition to the protective cover and shield assembly. Furthermore, while a specific configuration and arrangement of grille guard and fender guard cover assembly has been described for use with the Model T600A Kenworth truck, such is given more for the purpose of illustration and not limitation, the important feature being that it can be effectively combined with the cover and shield assembly or, in the alternative, the cover and shield assembly may be installed without the grille guard and fender masks. Thus, the cover and shield assembly 10 will serve as an effective means for deflecting foreign particles and preventing the accumulation of insects on the windshield and most desirably is aerodynamically contoured to present a minimum amount of drag while deflecting the airstream both in an upward direction over the windshield and in a lateral direction away from the sides of the hood and windshield area.

It is therefore to be understood that various modifications and changes may be made in the construction and arrangement of parts making up the preferred embodiment of the present invention without departing from the spirit or scope thereof as defined by the appended claims.

We claim:

1. A deflector shield unit for a motor vehicle wherein the motor vehicle has a hood and grille with an outer surrounding portion extending between an upper horizontal edge and vertical sides of said hood and said grille, said unit comprising:
    an elongated shield of unitary construction having a front, generally horizontal edge and opposite vertical side edges conforming to and overlying the upper horizontal edge and vertical sides, respectively, of said hood and a transparent shield portion inclining rearwardly at an acute angle away from said horizontal and opposite vertical side edges;
    shock mount means comprising at least one elongated flexible strip composed of a rubber or rubber-like material interposed between said shield and said hood including a rearwardly and upwardly inclined channel into which said upper edge of said shield is inserted; and
    fastener means for fastening said shock mount means to said hood including means for retaining said horizontal edge of said shield in said channel of said shock mount means.

2. A shield unit according to claim 1, said shock mount means comprising a pair of elongated flexible strips in spaced but end-to-end relation to one another along said upper horizontal edge of said hood.

3. A shield unit according to claim 1, including side shock mount means affixed to each vertical side of said hood, each of said side shock mount means defined by a flexible strip of rubber or rubber-like material having an upwardly facing channel into which opposite side edges of said shield are inserted.

4. A shield unit according to claim 1, including a molded wrap-around cover plate having an upper horizontal portion and opposite vertical side portions disposed in at least partially overlapping relation to said horizontal edge and opposite vertical side edges of said shield.

5. A shield unit according to claim 4, said fastener means extending through said cover plate and said shock mount means.

6. A shield unit according to claim 5, said cover plate having end caps covering said side shock mount means, and side fastener means extending through said end caps and said side shock mount means for connection to said vertical sides of said hood.

7. A shield unit according to claim 1, including a molded guard member conforming to the contour of surrounding portion of said upper horizontal end and vertical sides of said hood, and connecting means for connecting said guard member in overlying relation to said surrounding portion.

8. A shield unit according to claim 7, including lower left and right fender guard members conforming to and disposed in surrounding relation to each front fender and headlight portion of said vehicle.

9. A shield unit according to claim 1, wherein said hood portion is characterized by having a raised center portion along said upper horizontal edge, said elongated shield having a correspondingly raised center portion conforming to said hood center portion, and a cover assembly including cover sections extending along said upper horizontal edge and vertical sides of said hood, end caps at lower ends of said vertical sides of said cover sections, and a cover cap conforming to the contour of said raised center portion of said hood with opposite sides of said cap disposed in overlapping relation to adjacent ends of said cover section.

10. A deflector shield and guard assembly for a motor vehicle wherein the motor vehicle has a hood portion and grille and an outer surrounding portion including an upper horizontal end and vertical sides together with front and left right fender portions and recessed openings in surrounding relation to headlight portions in the front fender portions, said unit comprising:
    an elongated shield of unitary construction having a front, generally horizontal edge and opposite vertical side edges conforming to and overlying the upper horizonal edge and vertical sides of said surrounding portion, and a transparent shield portion inclining rearwardly away from said horizontal and opposite vertical side edges;
    mounting means interposed between said shield and said hood portion including a rewardly and upwardly inclined channel into which said horizontal edge of said shield is inserted, and fastener means for fastening said mounting means to said hood portion portion including means for retaining said horizontal edge of said shield in said channel of said mounting means;
    a guard member conforming to the contour of said surrounding portion, and connecting means for connecting said guard member to said surrounding portion;
    lower left and right fender guard members conforming to and diposed in surrounding relation to each front fender and headlight portion of said vehicle; and wherein said motor vehicle is characterized by having a raised center portion, said shield having a correspondingly raised center portion conforming to said hood center portion, and a cover assembly including cover sections extending along said upper horizontal end and vertical sides of said hood portion, end caps at lower ends of said vertical sides of said cover sections, and a cover cap conforming to the contour of said hood center section, and a joint between opposite sides of said cap and adjacent ends of said cover sections.

11. A shield unit according to claim 10, said mounting means comprising a pair of elongated flexible strips in spaced relation to one another along the upper horizontal end of said hood portion, and side mount means affixed to each vertical side of said hood portion, each of said side mounting means defined by an elongated flexible strip having an upwardly facing channel into which opposite side edges of said shield are inserted.

12. A shield unit according to claim 11, including a molded wraparound cover plate having an upper horizontal portion and opposite vertical side portions disposed in at least partially overlapping relation to said horizontal edge and opposite vertical side edges of said shield behind and in abutting relation to said guard member.

13. A shield unit according to claim 12, said cover plate having end caps covering said side mount means, and side fastener means extending through said end caps, said cover plate and said side mount means for connection to said vertical side of said hood.

* * * * *